US008149336B2

(12) United States Patent
Mohanty et al.

(10) Patent No.: US 8,149,336 B2
(45) Date of Patent: Apr. 3, 2012

(54) METHOD FOR DIGITAL NOISE REDUCTION IN LOW LIGHT VIDEO

(75) Inventors: Kamini Kanta Mohanty, Bhubaneswar (IN); Venkatagiri Subbaraya Rao, Bangalore (IN); Jeremy Craig Wilson, Delta (CA)

(73) Assignee: Honeywell International Inc., Morristown, NJ (US)

( * ) Notice: Subject to any disclaimer, the term of this patent is extended or adjusted under 35 U.S.C. 154(b) by 1001 days.

(21) Appl. No.: 12/116,769

(22) Filed: May 7, 2008

(65) Prior Publication Data

US 2009/0278961 A1    Nov. 12, 2009

(51) Int. Cl.
*H04N 5/00* (2006.01)
(52) U.S. Cl. ....................................................... 348/607
(58) Field of Classification Search .................. None
See application file for complete search history.

(56) References Cited

U.S. PATENT DOCUMENTS

| | | | |
|---|---|---|---|
| 6,546,149 B1 | 4/2003 | Ruggiero et al. | |
| 6,801,672 B1 | 10/2004 | Thomas | |
| 7,046,307 B1 | 5/2006 | Hui | |
| 7,050,501 B2 | 5/2006 | Alvarez | |
| 7,199,838 B2 | 4/2007 | Lin et al. | |
| 2004/0008904 A1 | 1/2004 | Lin et al. | |
| 2005/0025382 A1 | 2/2005 | Oizumi et al. | |
| 2005/0107982 A1 | 5/2005 | Sun et al. | |
| 2005/0134737 A1* | 6/2005 | Honma | 348/569 |
| 2005/0135699 A1 | 6/2005 | Anderson | |
| 2006/0044475 A1 | 3/2006 | Lin et al. | |
| 2006/0055826 A1* | 3/2006 | Zimmermann et al. | 348/625 |
| 2006/0103765 A1 | 5/2006 | Zhou et al. | |
| 2006/0139494 A1 | 6/2006 | Zhou et al. | |
| 2006/0158562 A1* | 7/2006 | Rhee | 348/607 |
| 2009/0015720 A1* | 1/2009 | Yamamoto | 348/607 |

OTHER PUBLICATIONS

Buades, A. et al., "Denoising image sequences does not require motion estimation", IEEE Conference on Advanced Video and Signal Based Surveillance, AVSS 2005, pp. 70-74.
Buades, A. et al., A Review of Image Denoising Algorithms, With a New One, Multiscale Modeling and Simulation (2005), vol. 4, No. 2, pp. 490-530.
Zlokolica, V., "Advanced Nonlinear Methods for Video Denoising", PhD Thesis, Greek University.

* cited by examiner

*Primary Examiner* — Brian Pendleton
*Assistant Examiner* — Jason Lin
(74) *Attorney, Agent, or Firm* — Husch Blackwell

(57) ABSTRACT

A system and method for filtering video noise is provided. Video generated under low lighting conditions is susceptible to increased noise and graininess, which increases the required storage space required for recording the noisy video. The provided system and method for filtering video noise reduces noise in low-light video by estimating the noise profile associated with at least one video frame; discriminating between chrominance noise and luminance noise in said noise profile; applying predetermined filter criteria to said chrominance noise to estimate the parameters for luminance noise filtering; applying said luminance noise filtering parameters to filter the luminance noise; and generating a first filtered output of a frame by logical combination of outputs obtained from luminance noise filter and chrominance noise filter.

16 Claims, 11 Drawing Sheets

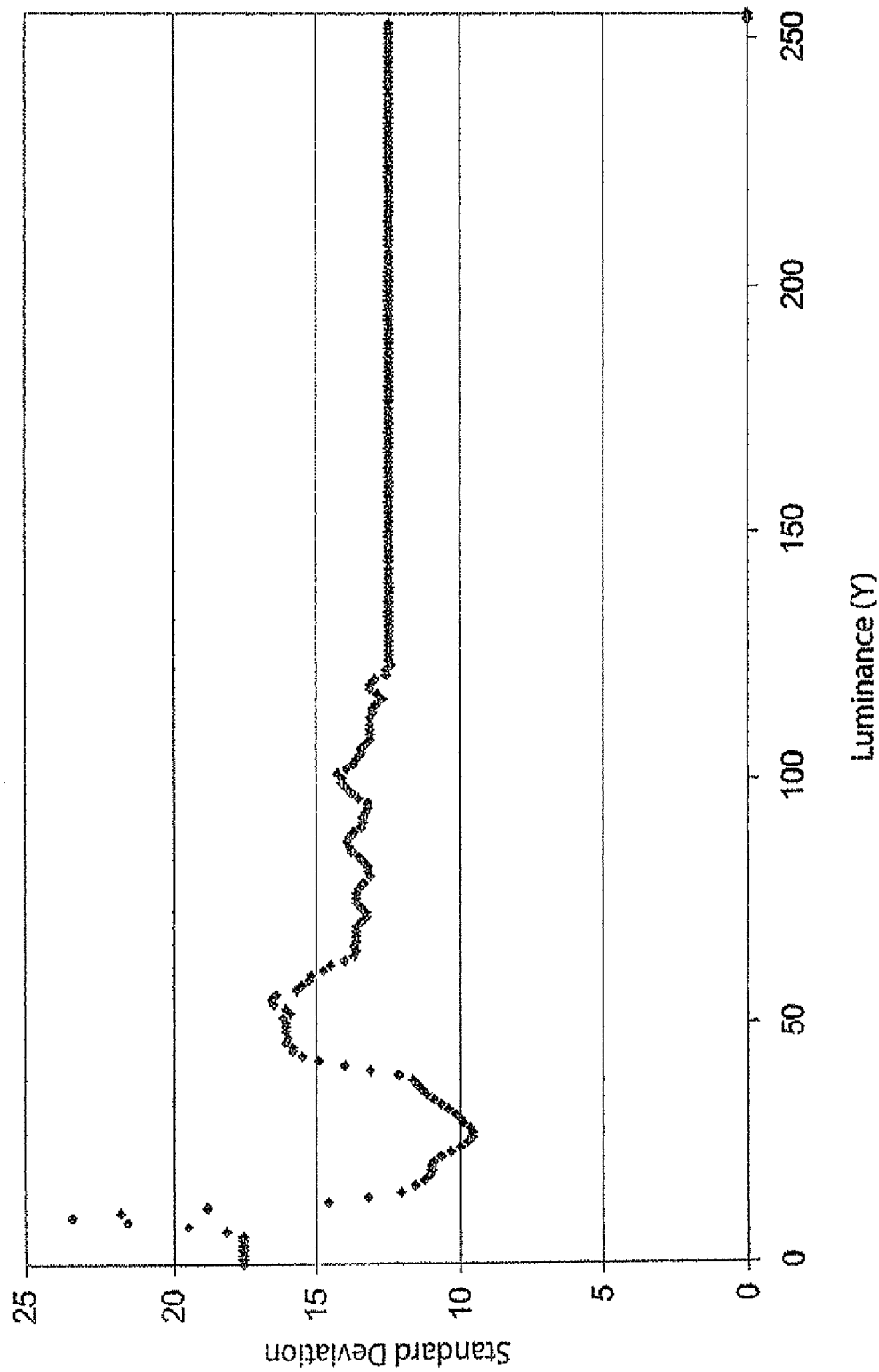

METHOD FOR DIGITAL NOISE REDUCTION IN LOW LIGHT VIDEO

FIELD OF THE INVENTION

The present invention relates generally to video production, and more specifically the present invention relates to a method for digital noise reduction (DNR) in low light video.

BACKGROUND OF THE INVENTION

Video acquired under low light condition is often noisy and of poor visual clarity. A much higher bitrate is required to store these noisy videos than for storing noise-free video. Hence, application of noise filtering is a fundamental low level preprocessing step for any video acquired under low light. The noise filtering also results in lower false alarm rate for video analytics and motion triggered recording. It has been observed that even under normal illumination condition wherein noise may not be visually apparent; application of noise reduction filter brings in significant savings in bitrate.

Noise is a component of any digital video, however, noise is more apparent in low light conditions over homogeneous regions. Even under constant illumination, the number of photons incident on a CCD or CMOS sensor at any given exposure interval is stochastic in nature. This inherent randomness in incident photon gives rise to photon noise. Other sources of noise in surveillance video are thermal noise or dark current, defective sensing elements, quantization error, compression error and transmission error. At high temperature, additional free electrons are released from the CCD that contaminates the count of true photoelectrons giving rise to dark current. Use of high gain (high sensitivity mode) under low light conditions drives noisy pixels to saturation leading to what is known as "white-tailed noise". Each of these types of noise follows a different distribution. Several approaches are taken to improve the image quality under low light conditions. Notable techniques for improving image quality under low light conditions are discussed below.

Digital Slow Shutter (DSS), wherein the sensor is allowed to integrate for longer duration, and a frame buffer outputs the most recent complete frame while the next one is being integrated). A problem with this approach is that motion areas in the picture (which can often be of greater interest than the static background) appear blurred as a result of the long integration time.

Digital Noise Reduction wherein the sensor continues to operate at a specified frame rate and frame averaging is done in a dedicated hardware to provide a continuous output image, along with change or motion detection to make use of the current image wherever there is motion. Any motion regions therefore tend to be noisy, but the blur is reduced to that which would normally occur without any such motion-sensitive integration.

Digital noise filtering is an active area of research covered by a large number of patents and publications. A wide range of techniques are used for filtering of image noise. The most prominent among them are Markov Random Field (MRF), wavelet shrinkage, anisotropic diffusion, bilateral filtering and total variation minimization.

Most video noise reduction algorithms need to assume a particular noise model. While thermal noise follows an additive white noise model, the photon noise is intensity dependent. A first step in a generic video noise reduction approach is noise estimation. This is required to decide whether to apply a noise removal algorithm and to select appropriate parameters for noise reduction filtering. Excessive filtering results in loss of image structure, whereas minimal filtering leaves behind traces of residual noise. Noise can be estimated using a single frame (intra-frame analysis) or through a sequence of frames (inter-frame analysis) or a combination of both. Spatial and temporal redundancies are the keys to digital video noise removal.

In the spatial domain, noise can be estimated using local variances in small image blocks over homogeneous regions. To estimate noise, median absolute deviation (MAD) can be used as a substitute in place of a computation intensive variance measure. Higher order moments for noise estimation, which, of course, is more computation intensive are sometimes advocated. A more computationally efficient approach uses local gradients in place of variance. Alternatively, one can use wavelet-based analysis wherein noise is estimated through investigation of sub-band energy. In yet another approach, a difference between a smoothed image and the original image is computed, and the threshold difference is used as a measure of image noise.

Inter-frame noise analysis techniques use temporal variances over motionless areas as an estimate for noise. For black and white images, noise is modeled for the intensity channel alone. On color images, noise modeling is carried out separately for each of the color channels. Two approaches for estimating noise from a single video frame while ignoring image details are described in U.S. Pat. No. 7,046,307 issued to Hui and in U.S. Publication No. 2006/0103765 (Zhou et al.). Both these references consider an additive Gaussian noise model. A technique for noise estimation from a sequence of frames is adopted in U.S. Pat. No. 6,546,149 issued to Ruggiero et al. A recursive approach for noise estimation in temporal domain is followed in U.S. Publication No. 2005/0107982 (Sun et al.).

A video can be viewed as a 3D data set comprising of two spatial dimensions and one temporal dimension. Like noise estimation, noise removal can be carried out in a spatial (pixel) dimension, in a temporal dimension, or in both dimensions. The last one can be a separable implementation, i.e. separate noise filtering in spatial and temporal dimensions or a complete 3D filtering. In case of a separable 3D filtering, the options are whether to apply it first in temporal dimension or spatial dimension. A noise removal filter for video data should make use of both temporal and spatial dimensions. It can be done in original pixel) spatial domain or in a transformed domain. Filtering of individual images can be carried out using 2D local filter. Reducing noise in a video or image sequence requires 3D spatial filters to get best results. A 3D filter makes use of local correlation in both spatial and temporal dimensions along with high frequency spectrum of image noise. One of the challenges in local filtering for noise removal is removing image noise while preserving the image structures. The commonly used local filters are local average (mean) filter, median filter, k-NN filter, sigma filter, Lee filter, Gamma filter, Frost filter etc. The underlying concept is to replace a pixel by the most representative 3D neighbor that preserves image structures and foreground objects. Filtering of motion regions is carried out using local statistics, noise estimates and a threshold measure. Such filters generally do a reasonable job at the cost of blurring.

Image noise reduction by edge-preserving image smoothing (low-pass filtering) is described in U.S. Publication No. 2005/0135699 (Anderson) and U.S. Publication No. 2005/0025382 (Oizumi et al.). The methods disclosed in Anderson and Oizumi et al. attempt to identify a local edge and preserve it by applying a low pass filter in the edge direction. However these methods are computationally intensive.

A motion sensitive temporal filtering for video noise reduction is suggested in U.S. Publication No. 2006/0044475 (Lin et al.). Separable implementations of noise reduction in spatial and temporal domains are adopted in U.S. Publication No. 2006/0139494 (Zhou et al.), U.S. Publication No. 2006/0158562 (Rhee), and U.S. Pat. No. 7,199,838 issued to Lin et al. These references make use of motion detection and spatial as well as temporal filtering. The final output is either a selection or combination of multiple spatial and temporal filtered outputs.

Adaptive filters allow accounting for motion without explicit motion detection. Recursive median, recursive mean and other regressive models belong to this category. These regressive models are preferred over filtering techniques that make use of explicit motion detection due to their computational efficiency and robustness to motion blur in high noise conditions. Motion compensated filters compute local motion regions using block matching, optical flow or other explicit motion detection. Such filters use 3D blocks for filtering that is fully compensated for motion. They are found to be the best in moderate noise conditions.

Noise removal can also be performed in a number of transformed domains that includes Fourier, wavelet, curvelet, PCA, ICA, etc. Among all these methods wavelet domain analysis has been the most successful one. The wavelet-based method applies wavelet transform to carry out local scale analysis and then associates larger wavelet coefficients with signal and smaller ones with noise. The most commonly used wavelet noise reduction technique uses a wave shrink (wavelet coefficient shrinking) approach in which the wavelet coefficients are manipulated in some way or the other followed by an inverse transform, as described in U.S. Publication No. 2004/0008904 (Lin et al.) and U.S. Pat. No. 6,801,672 issued to Thomas.

Wavelet shrinkage can be hard (removing all coefficients below a threshold), soft (reducing all coefficients by a proportionality factor), non-linear (modification of coefficients using a nonlinear function), spatially adaptive or any combination of these. A 3D wavelet analysis supporting spatio-temporal filtering is also advocated. However, it is common to adopt a recursive motion sensitive filtering on wavelet coefficients.

SUMMARY OF THE INVENTION

As discussed above, the prior art methods assume an additive Gaussian noise model instead of using an intensity dependent noise model to distinguish between image structure and noise. In contrast, the present invention utilizes an intensity dependent noise model estimated for the input video using a sequence of frames. The estimated noise profile is used to fix filter settings and distinguish image structures from noise. The noise filtering operates on both a spatial domain (intra-frame filtering) and a temporal domain (inter-frame filtering of a frame sequence).

The intra-frame filtering is applied separately on luminance and chrominance channels for color video. The luminance filtering is carried out using a quality parameter derived from the filtered chrominance channel.

The inter-frame filtering is achieved by weighted linear combination of the current spatially filtered frame with the previous filtered output. The relative weight is decided by the difference between the current spatially filtered frame and previous filtered frame along with the estimated noise model.

A feature of the present invention is the retrieval of an intensity dependent noise model from the video and uses it within both spatial and temporal noise filtering frameworks.

Within the spatial filtering framework, after performing a color-filtering operation, an embodiment of the present invention derives a color noise parameter, which is used as a quality parameter for luminance filtering. Similarly, the temporal filtering also uses the noise model along with a frame difference to determine foreground probability of every pixel.

An embodiment of the present invention separating a video frame into luminance channel data and chrominance channel data; filtering the chrominance channel data to reduce chrominance noise and the luminance channel data to reduce luminance noise; combining the filtered chrominance channel data and the filtered luminance channel data to generate a first filtered output; blending the first filtered output with a second filtered output generated from a previous video frame to generate a noise-reduced video.

Another embodiment of the present invention estimates a noise profile associated with at least one video frame. The at least one video frame is separated into luminance channel data and chrominance channel data. A predetermined filter criteria is applied to chrominance noise of the chrominance channel data for generating filtered chrominance channel data. Estimated luminance noise filtering parameters are generated based on the chrominance channel filtering. The luminance noise filtering parameters are applied to the luminance channel data to filter luminance noise. The filtered chrominance channel data and the filtered luminance channel data are combined to generate a first filtered output. The first filtered output is a spatially filtered full color video frame. The first filtered output is blended with a second filtered output of a previous frame of the at least one video frame using a weighted blending function.

Another embodiment of the present invention is a system having an estimating unit for estimates a noise profile associated with at least one video frame; a discriminating unit for separating the at least one video frame into luminance channel data and chrominance channel data; a chrominance filtering unit for applying predetermined filter criteria to chrominance noise of the chrominance channel data for generating filtered chrominance channel data; a parameter generating unit for generating estimated luminance noise filtering parameters based on the chrominance channel filtering; a luminance filtering unit for applying the luminance noise filtering parameters to filter luminance noise of the luminance channel data; a combining unit for combining the filtered chrominance channel data and the filtered luminance channel data for producing a first filtered output; and a blending unit for blending the first filtered output with a second filtered output of another frame previous to the frame.

Additionally, another embodiment of the present invention is a program disposed on a computer-readable medium for controlling a computer processor to perform the steps of the present invention.

Moreover, another embodiment of the present invention is a digital video recorder, and performs the video noise filtering during recording of video.

BRIEF DESCRIPTION OF THE DRAWINGS

These and other features, aspects, and advantages of the present invention will become better understood with regard to the following description, appended claims, and accompanying drawings wherein:

FIG. 3a-d are graphs illustrating noise profiles resulting from spatial estimation and temporal estimation in accordance with an embodiment of the present invention;

DETAILED DESCRIPTION OF THE INVENTION

The present invention implements a method for digital noise reduction that makes use of both intra-frame and inter-frame filtering. An intensity dependent noise model that is derived from a sequence of video frames controls the filter settings and filter parameters. The noise reduction algorithm of the present invention can ran in a standard PC environment at real time speed without taking recourse to specialized hardware. However, the preferred implementation is to host the noise-filtering module of the present invention within a digital signal processor (DSP) core. Such a DSP can be incorporated into a digital video recorder or in an intermediate device disposed between a video capture device and a video recording device.

DNR filtering is suitable for a variety of application scenarios. By implementing the DNR algorithm in a PC environment, it can be used to display noise free video while retrieving archived noisy video.

Alternatively, DNR filtering can be applied to raw video data before converting into MPEG or JPEG format. This use of the DNR algorithm of the present invention saves disk space while storing video data. The same logic is applicable to a video streamer that generates streaming video (in JPEG or MPEG format) as applying the DNR algorithm of the present invention results in considerable saving of transmission bandwidth.

Application of DNR helps in considerably reducing the false alarm rate of video analytics algorithms that ran on noisy input video. DNR can also be used to reduce false alarms in event triggered recording of video in video surveillance applications.

Digital Noise Reduction Algorithm

In accordance with the present invention, an intensity dependent noise is estimated for the input video in the temporal domain using a sequence of frames. The intensity dependent noise can also be estimated in spatial domain using a single frame. The estimated noise profile is used to fix filter settings and distinguish image structures from noise. The noise filtering operates sequentially in spatial domain (intra-frame filtering) and temporal domain (inter-frame filtering of a frame sequence). For color video, the intra-frame filtering is applied separately on luminance and chrominance channels. The luminance filtering is carried out using a quality parameter derived from filtered chrominance channel. The inter-frame filtering is carried out by a weighted linear combination of the current spatially filtered frame and the previously filtered output. The relative weight of the two components (current spatially filtered frame and previously filtered frame) is determined by the difference between the current spatially filtered frame and previous filtered frame along with the estimated noise model.

Figure 1:
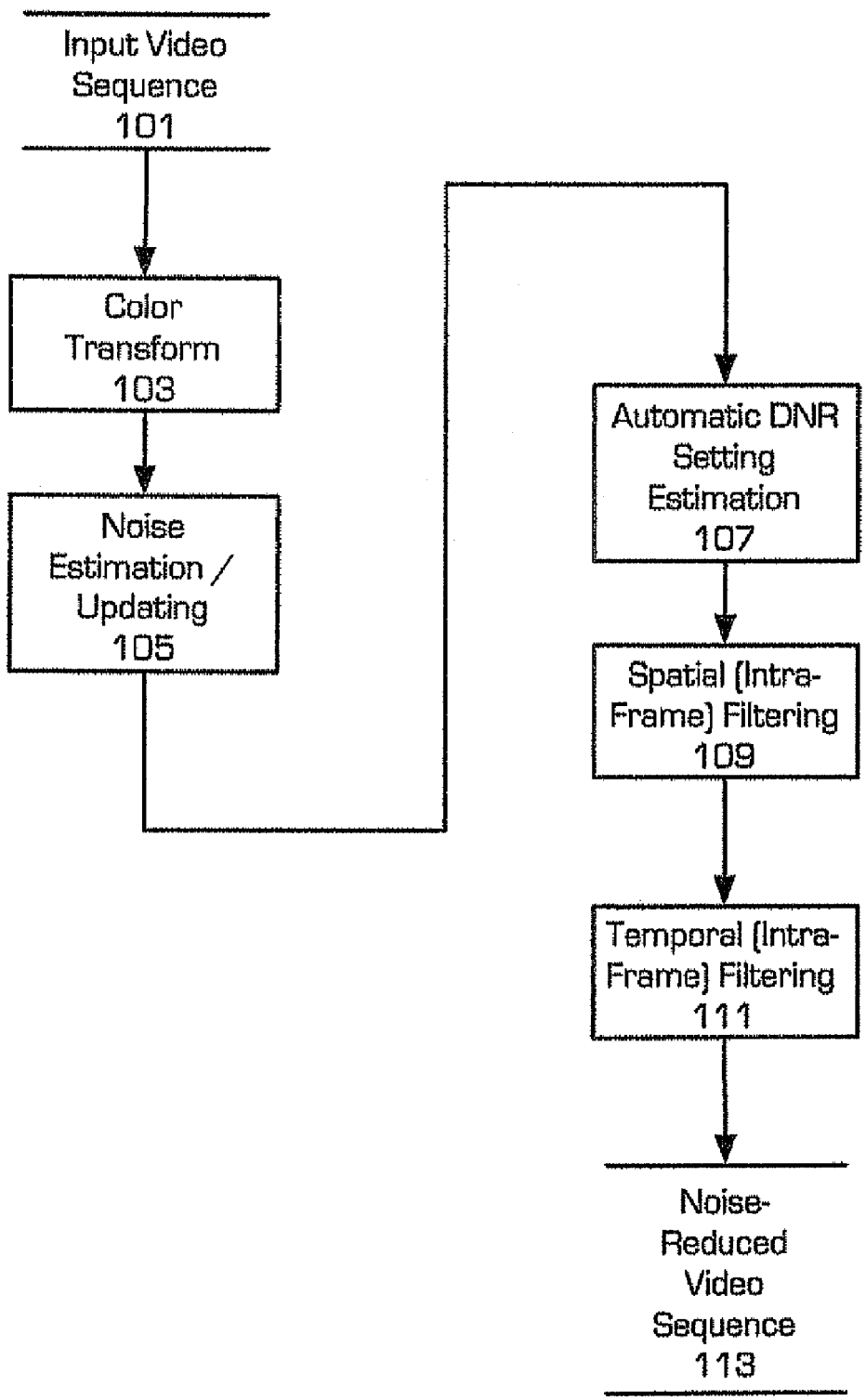
FIG. 1 illustrates a flow diagram of the process for digital noise filtering in accordance with an embodiment of the present invention.

Referring to FIG. 1, showing digital noise filtering in accordance with an embodiment of the present invention, an input video sequence is initially provided in step 101. A color transform is applied to the input video sequence in step 103. In step 105 a noise estimation and updating function is applied to the color-transformed input video sequence. Proceeding to step 107, automatic digital noise reduction settings are estimated. Intra-frame filtering is performed on the input video sequence in the spatial domain in step 109. Following the spatial filtering, intra-frame temporal domain filtering is performed in step 111. The output of the temporal filtering is a de-noised video sequence in step 113. The steps outlined above and shown in FIG. 1 are discussed in greater detail in the following sections.

Color Transform

The original image (if available in color as RGB channels) is transformed to $YC_bC_r$ domain for filtering. The $YC_bC_r$ Color Space, commonly used in video and digital photography, is defined by a Luma channel (Y), a Blue Chroma channel ($C_b$) and a Red Chroma channel ($C_r$). Luma represents the achromatic (black & white) image without any color, i.e., the brightness of an image. Chroma is the color information component of an image. In the case of $YC_bC_r$, $C_b$ is the deviation from gray relative to the Blue-Yellow axis, while $C_r$ is the deviation from gray relative to the Red-Cyan axis.

The transformation from RGB Color Space to $YC_bC_r$ Color Space is achieved as follows:

$$Y = 0.299 \cdot R + 0.587 \cdot G + 0.114 \cdot B \tag{1-1}$$

$$C_b = -0.16874 \cdot R - 0.33126 \cdot G + 0.5 \cdot B + 128 \tag{1-2}$$

$$C_r = 0.5 \cdot R - 0.4189 \cdot G - 0.08131 \cdot B + 128 \tag{1-3}$$

Inverse transform from $YC_bC_r$ domain to RGB domain is as follows:

$$B = Y + 1.772 \cdot (C_b - 128) \tag{2-1}$$

$$G = Y - 0.3441 \cdot (C_b - 128) - 0.7141 \cdot (C_r - 128) \tag{2-2}$$

$$R = Y + 1.402 \cdot (C_b - 128) \tag{2-3}$$

Although $YC_bC_r$ Color Space is considered in this invention, it may be noted that the method is applicable in any other Color Space such as YUV (Luma and two Chroma values) or HSV (Hue angle, Saturation and brightness Value) without any modification.

Noise Estimation

The first step in video noise reduction is estimation of noise and mean scene luminance. This is required to automatically switch on the noise removal algorithm and to select appropriate filter parameters for the noise reduction filter Filtering more than what is required will result in loss of image structure, while insufficient filtering will leave behind traces of residual noise. In other words, the quality of filtering directly depends on the accuracy of noise estimation.

The estimated noise model is used during filtering to distinguish image structure from noise. Spatial domain noise estimation is fast (doesn't bring in any delay in filtering) and is not affected by moving objects. However, spatial domain noise estimation fails to distinguish image structure and other high frequency details from noise.

Temporal domain noise estimation is unaffected by image details, but leads to noise overestimation in the presence of moving objects (foreground activity). In many applications of the present invention, noise estimation in temporal domain is preferred over spatial domain noise estimation. However, in the cases involving a pan-tilt-zoom (PTZ) camera, camera jitter and scenes with high foreground activity, noise can also be estimated in the spatial domain.

Figure 2:
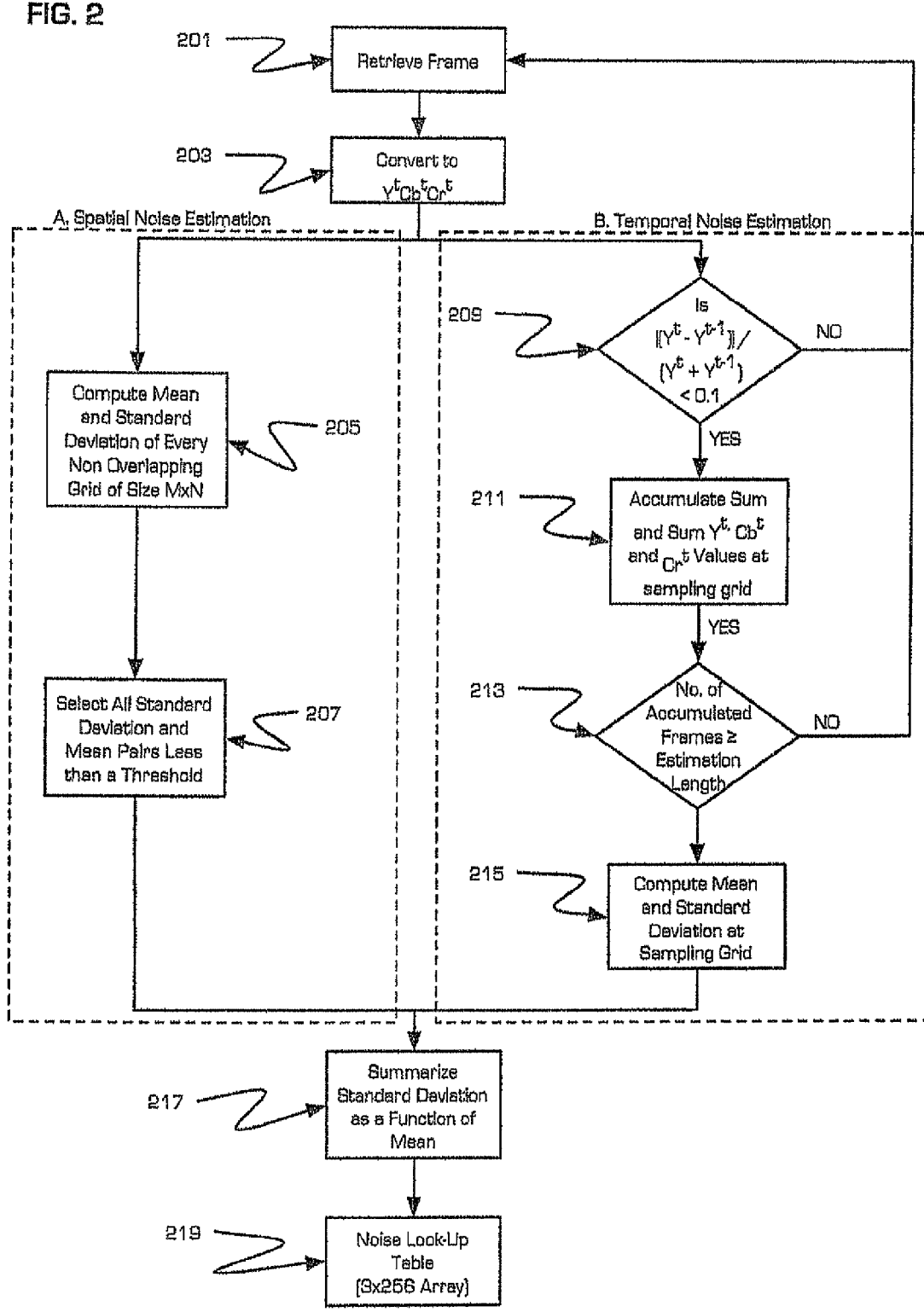
FIG. 2 illustrates a flow diagram of digital noise estimation in accordance with an embodiment of the present invention.

A process for digital noise estimation is shown in FIG. 2. A frame of a video sequence for digital noise estimation is retrieved in step 201. The retrieved frame is converted to $YC_bC_r$ color space in step 203. Spatial noise estimation is performed using the steps of branch A, while temporal noise estimation is performed using the steps of branch B.

Spatial Domain Noise Estimation

Noise is estimated in the spatial domain by computing local standard deviation over small non-overlapping image blocks with typical block size of 8×8 pixels in step 205. In step 207 all standard deviation and mean pairs having values less than a threshold are selected. The estimated standard deviation is expressed as a function of mean image intensity of the selected pairs in step 217. This is achieved by averaging out the standard deviation values of all blocks having the same luminance value across the image. The noise model is stored in a 3×256-size look-up table in step 219. The columns of the look-up table correspond to Y, $C_b$ and $C_r$ channels. The element at $i^{th}$ row and/h column of the look-up table stores the noise/standard deviation value of $j^{th}$ channel having a mean gray value i. The columns correspond to noise estimates of Y, $C_b$ and $C_r$ channels. Missing values in the look-up table are filled in using linear interpolation. The noise profile is also smoothed using a moving average filter. In order to get accurate noise estimation using this method, it is necessary to consider only homogenous regions in the image. Presence of structures leads to an overestimation of image noise.

In this noise estimation method, image structures are avoided by not considering all local standard deviation measurements above a threshold. However, if the variations in the image due to noise components are comparable with scene structure, this method does not provide a correct estimation. Spatial domain noise estimation is not recommended for use in noise filtering of video sequence, even though it is an obvious choice for noise estimation of images generated by PTZ cameras and digital still cameras.

Temporal Domain Noise Estimation

In the absence of foreground activity, illumination changes, or camera motion, the luminance and chrominance measurement at any given pixel should remain constant assuming zero noise. However, in actual practice there is variation in luminance and chrominance and this variance can be attributed to image noise. Estimation of noise in the temporal domain is more efficient than spatial domain estimation as it is not affected by the presence of edges and object details. In step 209 the variance between the current frame and the preceding frame is determined and if the variance is greater than a predetermined threshold value, the process returns to step 201 for retrieval of a subsequent frame. Otherwise, the process proceeds to step 211.

A group of frames (e.g. 8-10) is considered and the $YC_bC_r$ values at a sampled grid of pixel locations, where the $YC_bC_r$ of each pixel in the sampling grid is summed in step 211. In step 213, the number of accumulated frames is compared to the estimation length. If the number of accumulated frames is less then the estimation length, the process returns to step 201 to retrieve a subsequent frame. Otherwise, if the number of accumulated frames is greater than or equal to the estimation length, the process proceeds to step 215.

The mean and standard deviation values are computed from the sample grid across all frames in step 215. It is more appropriate to specify estimation length in terms of a time duration (milliseconds), rather than number of frames. A sampling grid of, for example, 8 pixels (in both line and pixel directions) is chosen to make noise estimation process computationally more efficient. Computed standard deviation values at grid locations are summarized in step 217 and stored in a look-up table similar to the one described for spatial noise estimation in step 219.

In order to reduce the effect of moving objects during noise estimation, only those pixels for which the change in luminance is less than 10% between successive frames are included in the noise estimate.

Figure 3A:
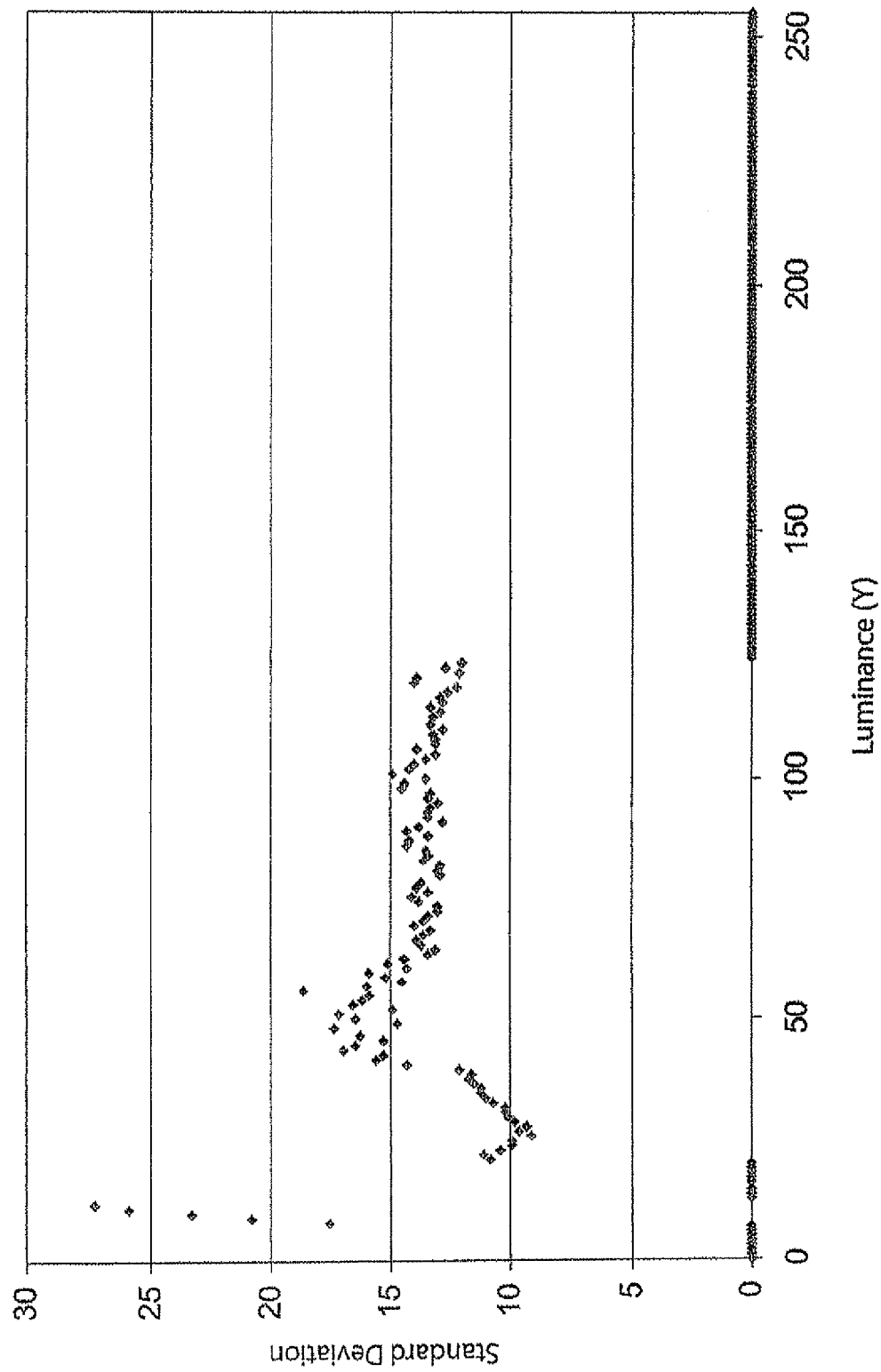

Referring to FIG. 3a-d, the graph of FIG. 3a shows a noise profile using spatial estimation of a low light image. The graph of FIG. 3b shows the spatial estimated noise profile after smoothing and interpolation is performed.

Figure 3C:
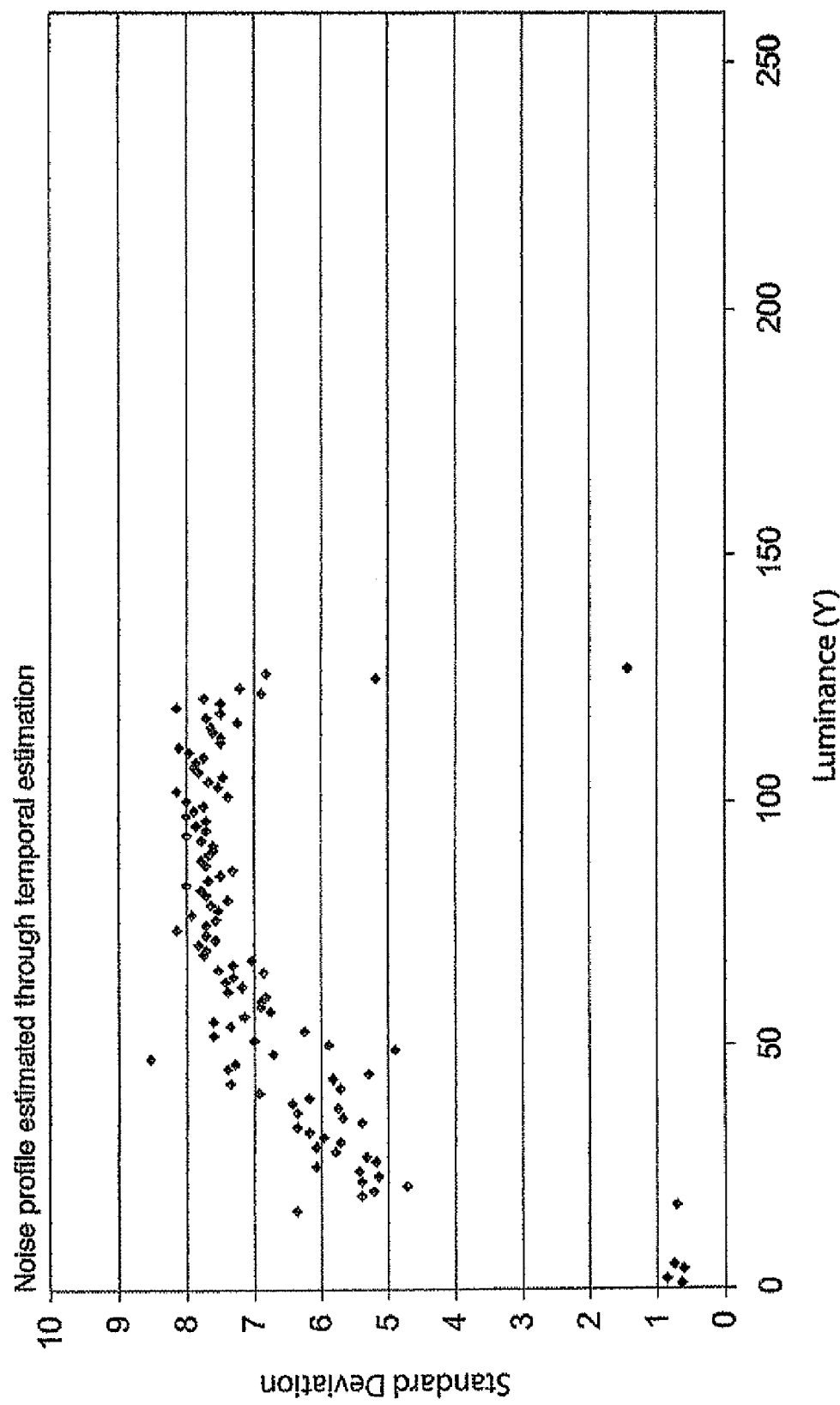
Figure 3D:
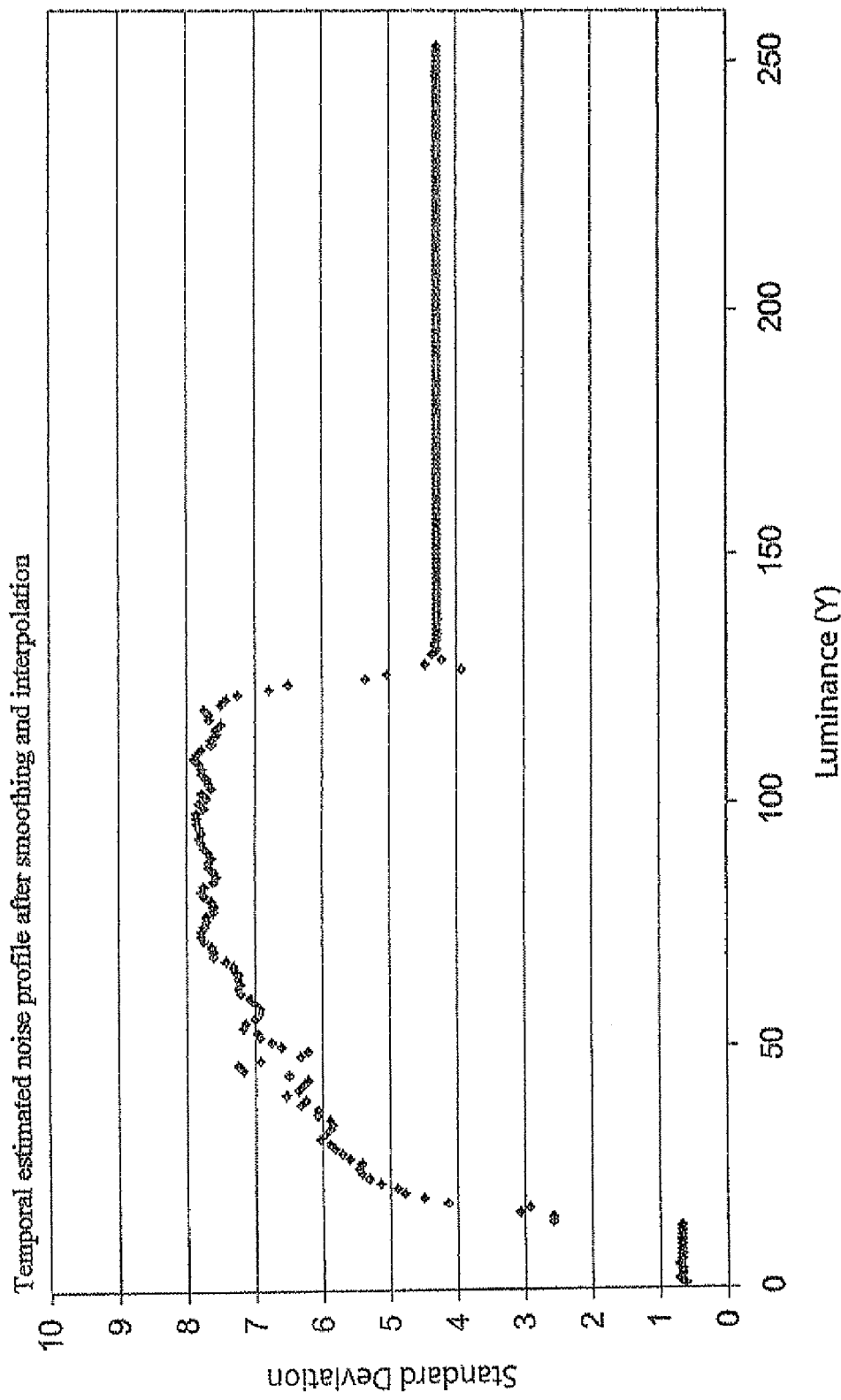

The graph shown in FIG. 3c represents a noise profile produced with temporal estimation of the low light image. The graph shown in FIG. 3d represents the temporal estimated noise profile after application of smoothing and interpolation functions.

Updating Noise Estimation

The initial estimate of noise is updated periodically. In the case of temporal noise estimation, the noise is computed periodically for a group of consecutive 8-10 frames. If a strong illumination change is detected, the ongoing noise estimation process is abandoned and a fresh set of frames are used for noise estimation, and a set of new filter settings are established. An illumination change is detected by measuring the change in mean luminance between consecutive frames. In an exemplar embodiment of the present invention, a default value for threshold luminance change leading to new filter setting is kept at 10% on the basis of observation from a large number of data sets. Besides, in an operational environment, it is desirable to compute the filter setting at regular interval of time to account for gradual day light change associated with outdoor cameras.

Spatial Domain Filtering

Spatial filtering is applied separately to the color and luminance channels. In fact, this is the primary reason for transferring from the RGB color domain to the $YC_bC_r$ domain. False color noise (FCN) in the video image is highly correlated spatially. Correlation length of FCN is found to extend either in the horizontal or the vertical direction by 8 pixels or more for certain camera types and illumination conditions. The magnitude of FCN is different for individual color channels due to the typical Bayer filter pattern on the imaging element, such as a CCD. The impact of FCN is seen more on the color components than on the luminance component. The blue channel happens to be most affected by FCN, while the green channel is the least affected one. A large filter window is required to eliminate FCN noise.

Figure 4:
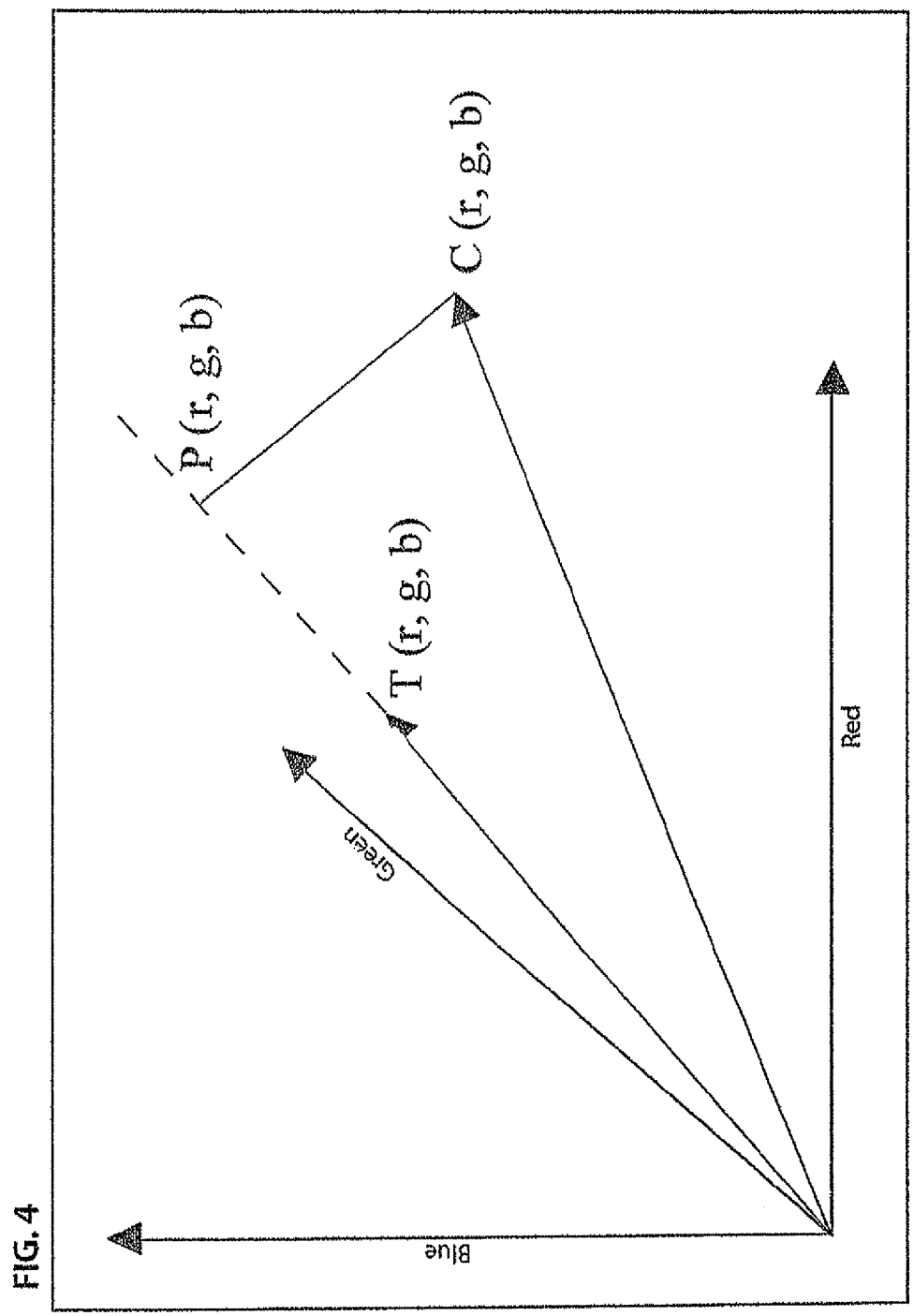
FIG. 4 illustrates false color filtering in accordance with the present invention.

The concept of FCN noise and its filtering is shown in FIG. 4 using the RGB Color Space, where the axis are formed along the Blue, Green and Red directions to form a three-dimensional space. Chrominance filtering is able to restore the noisy color (C) back at true color (P), but it leaves behind a residual noise in luminance (TP). The objective of luminance filtering is to get rid of this residual noise. A weight factor that is inversely proportional to error in color components (with respect to local dominant color) is used for filtering.

Spatial chrominance filtering of color channels ($C_b$ and $C_r$) involves computing dominant color using a local histogram analysis over large windows having a size on the order of 16×16. Although, other window sizes can be used. The exact size of the filter window is determined by the amount of noise in the scene. The filter window is shifted by half the window size across the image in line and pixel directions. Shifting the filtering window by smaller steps would result in better output quality, but will add to computation. For computational efficiency an average filter can be used in place of a dominant color filter even though the latter is found to be more efficient in terms of false color noise filtering. The color component ($C_b$ or $C_r$) at any pixel location is substituted by the local dominant or average color, if the difference between the dominant color component and the original color value is less than a threshold. The threshold is defined as a function of noise level—typically 3 times the noise value estimated for the original color value. In case the difference is beyond this threshold, the original color value is treated as an image feature and left untouched.

FCN also impacts the luminance channel, even though the effect is somewhat less when compared to noise in the chrominance channels. Filtering of the luminance channel cannot make use of large sized filter windows as this will lead to blurring. Hence, an edge-sensitive local weighted average filter is used for filtering the luminance channel. The weight of a pixel in averaging is directly proportional to luminance quality. The luminance quality is inversely proportional to color noise. Accordingly, the default filter window size for luminance filtering is 3×3 in the present embodiment. However, other appropriately sized filter windows may be used as well. A larger luminance filter window can be used if noise level is found to be high.

The quality of the luminance value at pixel location (i, j) is defined as:

$$\omega_{ij} = \frac{512}{|\overline{C_b} - C_b| + |\overline{C_r} - C_r|} \quad \text{if } \overline{C_b} \neq C_b \text{ and } \overline{C_r} \neq C_r$$

$$\omega_{ij} = 512 \qquad \text{otherwise}$$

Where $C_b$ and $C_r$ are color components of the noisy image at (i, j). $\overline{C_b}$ and $\overline{C_r}$ are color components of the dominant or average color estimated through chrominance filtering.

The filtered luminance value is a weighted average of local luminance values over the filter window. The weights are derived from quality measurements using equation 3. Only those neighbors that are within a two-sigma noise limit of the central pixel are averaged out.

Filtered luminance value $Y_{ij}^f$ at location (i,j) is defined as:

$$Y_{ij}^f = \frac{\sum_{k=i-m}^{i+m} \sum_{l=j-n}^{j+n} \omega_{kl} Y_{kl}}{\sum_{k=i-m}^{i+m} \sum_{l=j-n}^{j+n} \omega_{kl}} \quad \{k, l \mid \text{abs}(Y_{kl} - Y_{ij}) \leq 2\,\text{Noise}(Y_{ij})\} \tag{4}$$

where: Noise($Y_{ij}$)=Noise value at luminance value (Y) at location (i, j)

The edge preserving capability of luminance filtering is further improved if additional weights are used in luminance filtering that are a function of spatial distances from the central pixel. Such an implementation falls under the category of bilateral filtering, where filtered output is a function of both spatial and photometric distance. The quality measures derived in equation 3 provide for photometric distance. The spatial distance weight used in the present embodiment varies exponentially from the central pixel. However, other forms of spatial distance measures can also be used. Filtered luminance under this bilateral filtering scheme is given by the value $Y_{ij}^f$ at location (i,j), and is defined as:

$$Y_{ij}^{f'} = \frac{\sum_{k=i-m}^{i+m} \sum_{l=j-n}^{j+n} d_{kl} \omega_{kl} Y_{kl}}{\sum_{k=i-m}^{i+m} \sum_{l=j-n}^{j+n} d_{kl} \omega_{kl}} \tag{5}$$

for: $\{k, l \mid \text{abs}(Y_{kl} - Y_{ij}) \leq 2\,\text{Noise}(Y_{ij})\}$ where: $d_{kl} = \exp(-\sqrt{(i^2 + j^2)/(m^2 + n^2)})$ However, quality of luminance filter can be computed only for color images and not for grayscale images. For grayscale images, the quality of luminance is ignored and the spatial filtering of the luminance channel is carried out as follows:

$$Y_{ij}^f = \frac{\sum_{k=i-m}^{i+m} \sum_{l=j-n}^{j+n} Y_{kl}}{P} \tag{6}$$

for: $\{k, l \mid \text{abs}(Y_{kl} - Y_{ij}) \leq 2\,\text{Noise}(Y_{ij})\}$

In equation 6, P is the number of neighbors that lie within the 2-sigma noise limit of the central pixel.

Figure 5:
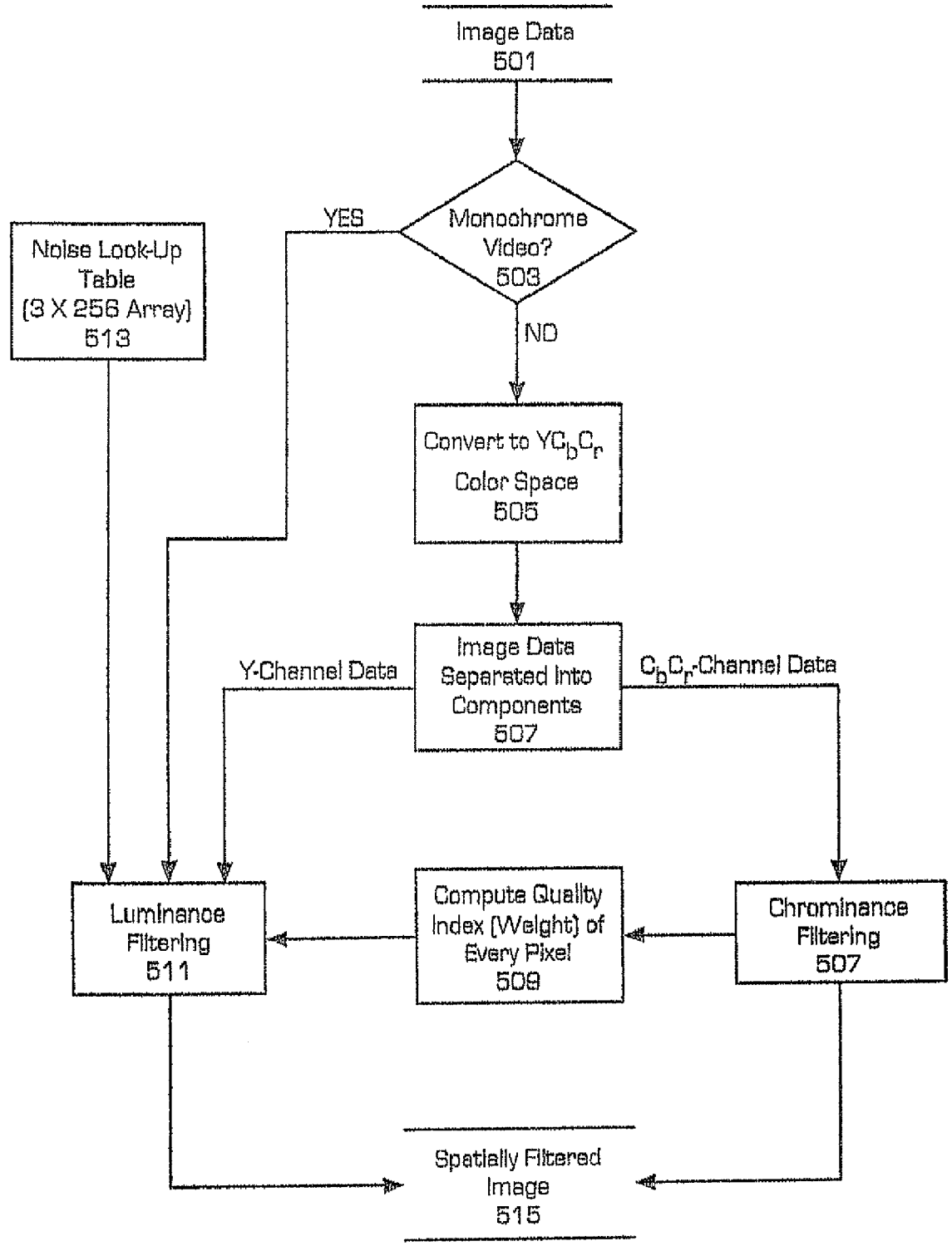
FIG. 5 illustrates a flow diagram for performing luminance filtering of video noise in accordance with an embodiment of the present invention.

A flowchart for spatial (intra-frame) filtering is shown in FIG. 5. Image data is provided to the spatial filtering process in step 501. First the image data is analyzed to determine if the video is monochrome or full color in step 503. If the image data is monochrome video, the process branches to step 511 where luminance filtering is applied in accordance with equation 6 and a noise look-up table 513. The output in step 515 is a spatially filtered monochrome video.

On the other hand, if in step 503 it is determined that the image data is not monochrome video, then the process continues on to step 505, where the image data is converted to the $YC_bC_r$ Color Space. In the next step 507, dominant/average color filtering is performed as described above. The quality index is computed in step 509 for every pixel. The process then performs luminance filtering in step 511 using the noise look-up table 513 and equation 5. The filtered luminance (Y) channel data output in step 511 and the filtered chrominance ($C_b$ and $C_r$) channel data output in step 507 are combined in step 515 to produce a spatially filtered color video in $YC_bC_r$ Color Space.

In yet another implementation, the luminance filtering is carried out as linear combination of pixel luminance and mean luminance of its neighbors. The relative weight of each of the components is decided by a gain factor that is function of local standard deviation ($\sigma_s$) and image noise. The luminance filtering is given by:

$$Y_{ij}^f = \overline{Y}_{ij} + \lambda_{ij} \cdot d_{ij} \tag{7-1}$$

$$\lambda_{ij} = 1 - \text{Noise}(\overline{Y}_{ij})/\sigma_s \tag{7-2}$$

$$d_{ij} = (\overline{Y}_{ij} - Y_{ij}) \tag{7-3}$$

In equations 7-1 through 7-3, $\overline{Y}_{ij}$ is the mean luminance at a local window centered at (i, j), and $Y_{ij}$ is the luminance at pixel location (i, j).

White-Tailed Noise Filtering

White-tailed noise is observed as individual isolated pixels that tend toward either white or black saturation (although they may not be 0 and 255 in terms of gray value). It is not really difficult to distinguish these from edge pixels. The white-tailed noise is dealt with by applying a small modification to the luminance filtering algorithm of the present invention. If the number of neighbors in a 3×3 neighborhood of a pixel that are within the noise limit of 2σ (i.e., 2 standard deviations) is less than or equal to 2 (theoretically it should be zero), the pixel is replaced by a local average of its entire neighbor excluding the white-tailed pixel itself. White-tailed noise is not significant under moderate lighting conditions, however, in low lighting conditions white-tailed noise can be quite pronounced.

Temporal Domain Filtering

The role of temporal filtering in low light video is analogous to use of a slower shutter speed or longer integration time. The main difference is that while use of a slower shutter speed results in motion blurring, the temporal filter avoids integration of moving objects and hence does not result in motion blurring.

The final filter output is a linear combination of a previous noise reduced frame and the current spatially filtered frame. The relative weight of the current spatially filtered frame and previous noise reduced frame depends upon the amount of foreground activity. More weight is given to the previous noise reduced frame for background regions, while for foreground regions the weight is more for the current spatially filtered frame. The likelihood of a pixel being background or foreground depends upon the difference between the current spatially filtered frame and the previous noise reduced frame and estimated noise model. The filtered output at time t at pixel location (i,j) for channel k is determined by the following equation:

$$FO_{ij}^k(t) = \alpha_{ij}^k FCN_{ij}^k(t) + \beta_{ij}^k FO_{ij}^k(t-1) \qquad (8\text{-}1)$$

In equation 8-1, $FCN_{ij}^k(t)$ is a false color noise filtered (re-filtered) output at time t at pixel location (i,j) for channel k, channel index k corresponds to the Y, $C_b$ and $C_r$ components, and $\alpha_{ij}^k$ is the weight given to the current FCN filtered frame, and is a sigmoid function of absolute difference ($d^k$) between the current spatially filtered frame and previous noise reduced frame, defined as:

$$\alpha_{ij}^k = \frac{1}{1 + \exp((N_{ij}^k - d^k)/N_{ij}^k)} \qquad (8\text{-}2)$$

$\beta_{ij}^k$ is the weight given to the previous noise reduced frame, defined as:

$$\beta_{ij}^k = 1 - \alpha_{ij}^k \qquad (8\text{-}3)$$

Figure 6:
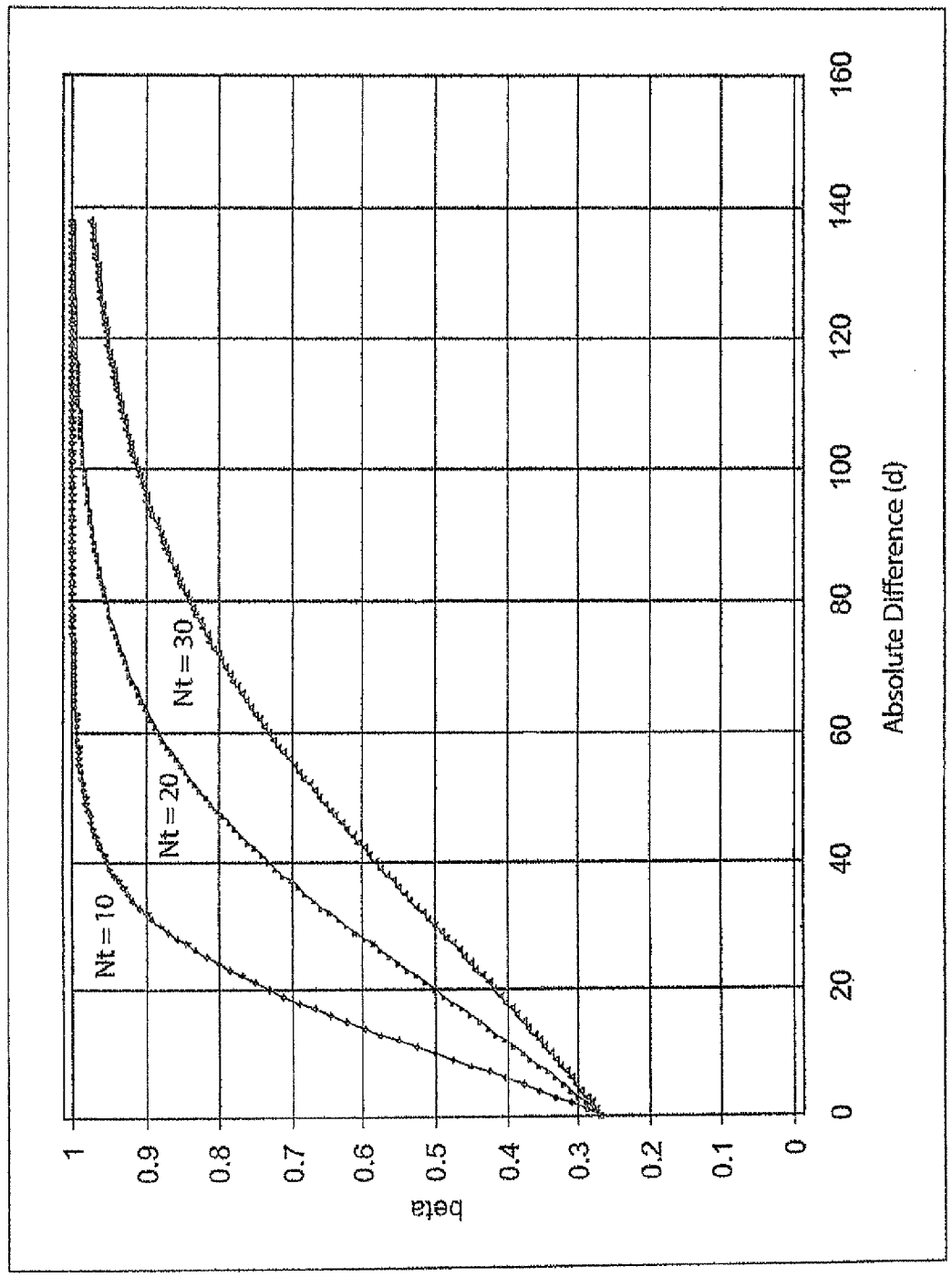
FIG. 6 is a graph showing β for different values of $d^k$ and noise threshold $N_t$ in accordance with an embodiment of the present invention.

A plot of β for different values of $d^k$ and noise threshold $N_t$ is shown in FIG. 6, in which $0 \leq \alpha_{ij}^k \leq 1$.

$$d^k = |FCN_{ij}^k(t) - FO_{ij}^k(t-1)| \qquad (8\text{-}4)$$

$$N_{ij}^k = \text{Noise}(S_{ij}^k)/\xi \qquad (8\text{-}5)$$

$$S_{ij}^k = [FCN_{ij}^k(t) + FO_{ij}^k(t-1)]/2 \qquad (8\text{-}6)$$

Noise($S_{ij}^k$) is the noise/standard deviation estimated for channel k for measurement $S_{ij}$, and $\xi \geq 1$ is a constant which controls the degree of filter setting. A higher value of ξ results in reducing degree of temporal filtering.

Automatic Digital Noise Filter Setting

One feature of the noise reduction algorithm of the present invention is fully automatic operation. This requires automatic detection of noise levels and selecting appropriate settings for the filter parameters. Use of the chrominance filter on a high light noise-free image with high color content results in color blurring. Hence, the entire spatial (intra-frame) filtering operation needs to be switched off for high light images. However, applying motion filtering with lower filter setting (higher 4 value) on high light images doesn't introduce any visual artifacts. The noise reduction filter settings are established on the basis of the noise figure obtained from the luminance and color channels.

The noise figure for channel k is defined as:

$$N_f^k = \sum_{P=0}^{255} N^k(P)/256 \qquad (9\text{-}1)$$

$N^k(P)$ is the noise profile of channel k. A noise profile is a one dimensional function of gray value (P).

The noise figures of $C_b$ and $C_r$ channels are grouped together to come up with a single noise figure, the color/chrominance noise figure ($N_{col}$), while the luminance noise figure $N_f^Y$ is treated separately for all purposes.

$$N_f^{col} = (N_f^{Cb} + N_f^{Cr})/2 \qquad (9\text{-}2)$$

The color block size for FCN filtering is decided based on the color noise figure ($N_f^{col}$). The size of the luminance filter window is governed by the maximum of the color and luminance noise figures. The motion filter setting value is purely based on the noise figure for the Y channel ($N_f^Y$). The filter settings for different noise figure values are given in Tables 1, 2 and 3. These setting have been arrived at after analyzing large video data sets acquired on different camera types and environmental conditions.

TABLE 1

Look-up table for Automatic Color block size setting in FCN filter

| Serial No. | Color Noise Figure ($N_f^{col}$) | FCN Color Block Size |
|---|---|---|
| 1 | <3 | Off |
| 2 | 3-6 | 8 × 8 |
| 3 | 6-10 | 16 × 16 |
| 4 | >10 | 32 × 32 |

TABLE 2

Look-up table for Automatic Luminance Filter size setting

| Serial No. | Max ($N_f^{col}$, $N_f^Y$) | Luminance Filter Size |
|---|---|---|
| 1 | <3 | Off |
| 2 | 3-5 | 3 × 3 |
| 3 | 5-6 | 5 × 5 |
| 4 | >6 | 7 × 7 |

TABLE 3

Look-up table for Automatic Temporal (Inter-frame) Filter setting

| Serial No. | Luminance Noise Figure ($N_f^Y$) | Motion Filter Setting (k) |
|---|---|---|
| 1 | <2 | 3 |
| 2 | 2-4 | $4/N_f$ |
| 3 | >4 | 1 |

Mean scene luminance ($\bar{L}$) is computed using the intensity histogram, while the noise figure is derived from the luminance noise profile. Mean scene luminance is defined as:

$$\bar{L} = \sum_{i=0}^{m} \sum_{j=0}^{n} Y_{ij}/(m*n) \quad (10)$$

In equation 10, m and n are the number of lines and pixels in the image. The mean luminance ($\bar{L}$) is used to sense a sudden change in luminance that calls for revised estimation of filter settings.

Filtering of Interlace Video

An interlace video is formed by interleaving odd and even fields acquired separately with a time gap. Such video suffers from comb artifacts in presence of moving foreground objects. An interlace structure preserving DNR filtering should extract the odd and even fields from the input frame and knit them back after filtering each field separately. However, from a computational perspective, an interlace structure preserving DNR filtering has been defined so as to avoid separating odd and even fields and knitting them back. An interlace structure impacts only the luminance filtering module of DNR filtering. This is achieved by changing the definition of line neighbor for the Y channel. For an interlace input, the luminance filtering uses the following formulation instead of equation 4:

$$Y_{ij}^{f} = \frac{\sum_{k=i-m}^{i+m, k+=2} \sum_{l=j-n}^{j+n} \omega_{kl} Y_{kl}}{\sum_{k=i-m}^{i+m} \sum_{l=j-n}^{j+n} \omega_{kl}} \quad (11)$$

for: $\{k, l \mid \text{abs}(Y_{kl} - Y_{ij}) \leq 2\,\text{Noise}(Y_{ij})\}$

In equation 11, the Noise(Y) is the luminance noise profile.

The performance of the DNR algorithm is dependent on the initial noise estimation and the setting of filter parameters. The optimum set of filter parameters are developed after testing on a variety of data sets obtained for different cameras under different lighting conditions. It is observed that under high scene activity (tree movement in particular), noise estimation becomes erroneous resulting in improper filtering. A manual filter setting needs to be used under such high scene dynamics.

Figure 7:
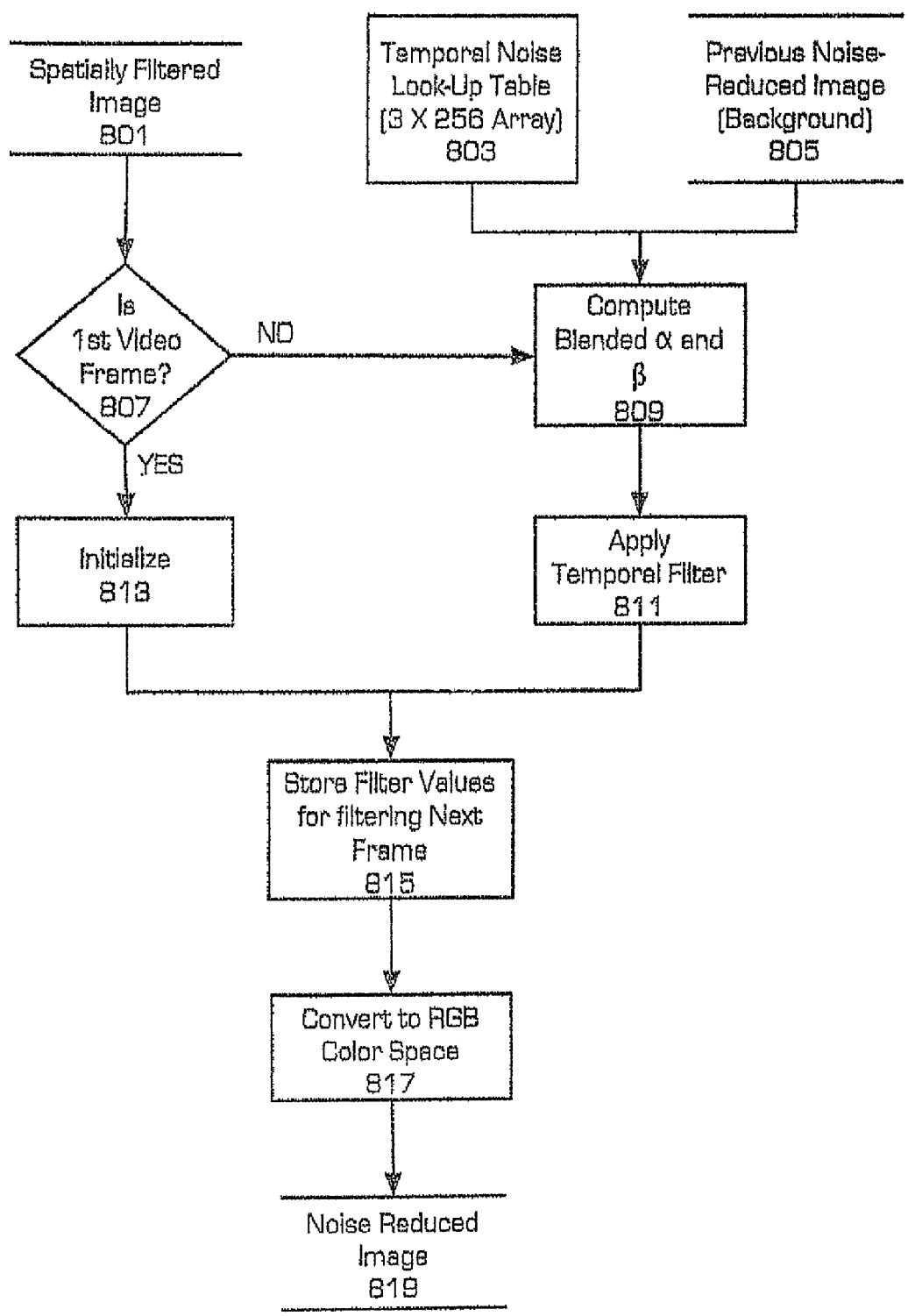
FIG. 7 illustrates a flow diagram for performing temporal filtering on spatially filtered images in accordance with an embodiment of the present invention.

Referring to FIG. 7, an embodiment of the present invention is shown wherein a spatially filtered image is provided for temporal noise filtering in step 801. The spatially filtered image may be the output described in step 515 of FIG. 5. The present embodiment also uses a temporal noise look-up table 803 and a previous noise reduced frame 805.

In the present embodiment, the process determines if the spatially filtered image is a first video frame in step 807. If the spatially filtered image is a first video frame, the process is initialized in step 813. Otherwise, if the spatially filtered image is not a first video frame, the process branches to step 809 where a blended α and β is computed for spatially filtered image using the temporal noise look-up table 803 and a previous filtered frame 805. The spatially filtered image is then filtered in step 811 using the computed blended α and β.

Once the process has completed either the initialization of the first video frame in step 813 or filtering in step 811, the process proceeds to step 815 where the filter values used are stored for filtering the next video frame. The filtered video frame is converted to RGB Color Space in step 817 and a noise-reduced image is output in step 819.

DNR filtering is suitable for a variety of application scenarios. By implementing the DNR algorithm in a PC environment, it can be used to display the noise free video while retrieving archived noisy video.

Alternatively, DNR filtering can be applied to raw video data before converting into MPEG or JPEG format, which saves disk space while storing video data. The same logic is applicable to a video streamer that generates streaming video (in JPEG or MPEG format), since applying the DNR algorithm results in considerable saving of transmission bandwidth.

Figure 8:
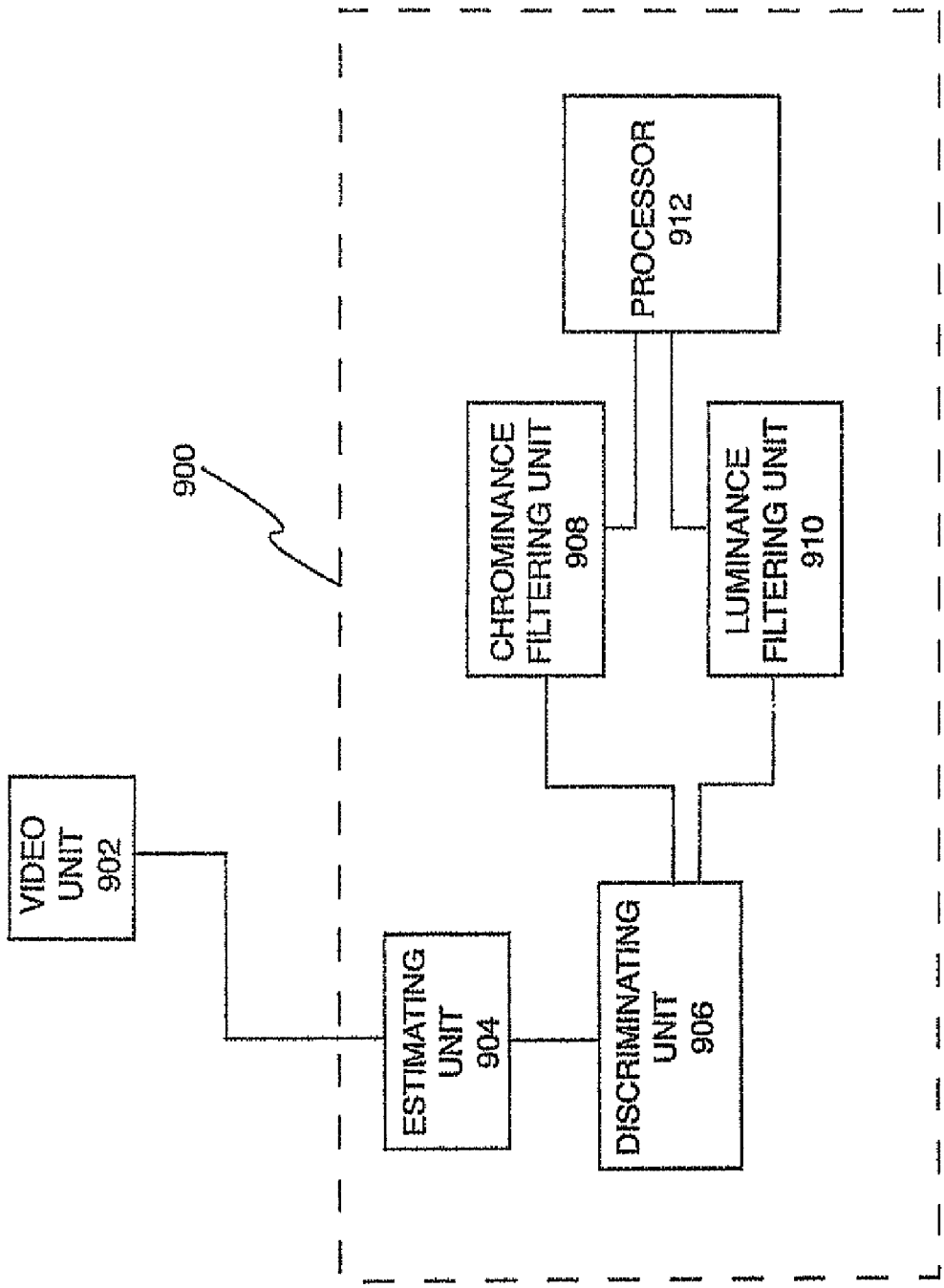
FIG. 8 illustrates a block representation of a system for digital noise reduction in accordance with the present invention.

Referring to FIG. 8, a system for digital noise reduction 900 is shown in accordance with the present invention. The system 900 receives digital video sequences from a video unit 902 such as a CCD or CMOS based video camera. The received video sequences are provided as an input to an estimating unit 904, where a noise profile is estimated from at least one video frame. The noise profile is passed to a discriminating unit 906, where the noise is categorized into chrominance noise and luminance noise. The chrominance noise is passed to a chrominance filtering unit 908, and the luminance noise is passed to a luminance filtering unit 910.

The chrominance filtering unit 908 applies a predetermined filtering criteria to the chrominance noise. The chrominance filtering unit 908 also outputs estimated luminance filtering parameters. The estimated luminance filtering parameters are used by the luminance filtering unit 910 when filtering the luminance noise. The outputs from the chrominance filtering unit 908 and the luminance filtering unit 910 are combined using a logical AND operation by a processor 912. The processor 912 outputs a resulting filtered frame.

Additionally, the processor 912, or a separate blending unit (not shown), blends the current filtered frame with a previous filtered frame generated from a previous frame of the video sequence.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A method of reducing noise in a video comprising:
   separating a video frame into luminance channel data and chrominance channel data;
   filtering said chrominance channel data to reduce chrominance noise and said luminance channel data to reduce luminance noise said filtering based upon a local standard deviation over non-overlapping image blocks of the video frame for said luminance channel data and for each of first and second channels of said chrominance channel data;
   combining said filtered chrominance channel data and said filtered luminance channel data to generate a first filtered output; and
   blending said first filtered output with a second filtered output generated from a previous noise-reduced video frame to generate a new noise-reduced video where a relative weight of the first filtered output and the second filtered output used in the blending of the first and second filtered outputs depends on the amount of foreground activity within the frames where relatively more weight is given to the previous noise reduced video frame for background regions and relatively more weight to the first filtered output for foreground regions.

2. The method of claim 1, wherein a weighting for blending of said first filtered output and said second filtered output is a function of said noise and of image differences.

3. The method of claim 2, wherein said image difference comprises pixel value differences between said first filtered output and said second filtered output.

4. The method of claim 1, wherein said luminance channel data is filtered using filtering parameters generated based on said chrominance channel filtering.

5. A method of reducing noise in a video comprising:
estimating a noise profile associated with at least one video frame;
separating said at least one video frame into a luminance channel data and chrominance channel data;
applying predetermined filter criteria to chrominance noise of said chrominance channel data for generating filtered chrominance channel data, said generating including computing a local standard deviation over non-overlapping image blocks of the video frame for each of first and second channels of said chrominance channel data and selecting image blocks with a local standard deviation less than a threshold;
generating estimated luminance noise filtering parameters based on said chrominance channel filtering;
applying said luminance noise filtering parameters to filter luminance noise of said luminance channel data; and
combining said filtered chrominance channel data and said filtered luminance channel data for producing a first filtered output, said first filtered output being a spatially filtered full color video frame; and
blending said first filtered output with a second filtered output of a previous noise-reduced video frame of said at least one video frame to create a new noise-reduced video where a relative weight of the first filtered output and the second filtered output used in the blending of the first and second filtered outputs depends on the amount of foreground activity within the frames where relatively more weight is given to the previous noise-reduced video frame for background regions and relatively more weight to the first filtered output for foreground regions.

6. The method of claim 5, wherein a weighting for blending of said first filtered output and said second filtered output is a function of said noise and of image differences.

7. The method of claim 6, wherein said image difference comprises pixel value differences between said first filtered output and said second filtered output.

8. A system for reducing noise in a video comprising:
an estimator that estimates a noise profile associated with at least one video frame;
a discriminator that separates said at least one video frame into a luminance channel data and chrominance channel data;
a chrominance filter that applies predetermined filter criteria to chrominance noise of said chrominance channel data that generates filtered chrominance channel data where said filtering unit computes a local standard deviation over non-overlapping image blocks of the at least one video frame for each of first and second channels of said chrominance channel data and selects image blocks with a local standard deviation less than a threshold;
a parameter generator that generates estimated luminance noise filtering parameters based on said chrominance channel filtering;
a luminance filter that applies said luminance noise filtering parameters to filter luminance noise of said luminance channel data; and
a combiner that combines said filtered chrominance channel data and said filtered luminance channel data for producing a first filtered output, said first filtered output being a spatially filtered full color video frame; and
a processor that blends said first filtered output with a second filtered output of a previous noise-reduced video frame to create a new noise-reduced video frame where a relative weight of the first filtered output and the second filtered output used in the blending of the first and second filtered outputs depends on the amount of foreground activity within the frames where relatively more weight is given to the previous noise-reduced video frame for background regions and relatively more weight to the first filtered output for foreground regions.

9. The system of claim 8, wherein a weighting for blending of said first filtered output and said second filtered output is a function of said noise and image difference.

10. The system of claim 9, wherein said image difference comprises pixel value differences between said first filtered output at a time instance and said second filtered output at previous time instance.

11. A video recording device having video noise reduction comprising:
a video acquirer that acquires a video stream;
an estimator that estimates a noise profile associated with at least one video frame;
a discriminator that separates said at least one video frame into a luminance channel data and chrominance channel data;
a chrominance filter that applies predetermined filter criteria to chrominance noise of said chrominance channel data for and that generates filtered chrominance channel data based upon a local standard deviation over non-overlapping image blocks of the video frame for each of first and second channels of said chrominance channel data,
a parameter generator that generates estimated luminance noise filtering parameters based on said chrominance channel filtering;
a luminance filter that applies said luminance noise filtering parameters to filter luminance noise of said luminance channel data;
a combiner that combines said filtered chrominance channel data and said filtered luminance channel data for producing a first filtered output, said first filtered output being a spatially filtered full color video frame;
a processor that blends said first filtered output with a second filtered output of a previous noise-reduced video frame, said blending unit generating a new noise-reduced video where a relative weight of the first filtered output and the second filtered output used in the blending of the first and second filtered outputs depends on the amount of foreground activity within the frames where relatively more weight is given to the previous noise reduced video frame for background regions and relatively more weight to the first filtered output for foreground regions; and
a video recorder that records said noise-reduced video.

12. The system of claim 11, wherein a weighting for blending of said first filtered output and said second filtered output is a function of said noise and image difference.

13. The system of claim 12, wherein said image difference comprises pixel value difference between said first filtered output and said second filtered output.

14. A non-transitory computer readable medium embodying a program executable by a computer processor for controlling said computer processor for performing a method of reducing noise in a video, said method comprising the steps of:

estimating a noise profile associated with at least one video frame; separating said at least one video frame into a luminance channel data and chrominance channel data;

applying predetermined filter criteria to chrominance noise of said chrominance channel data for generating filtered chrominance channel data where said generating is based at least in part upon computing of a local standard deviation over non-overlapping image blocks of the video frame for each of first and second channels of said chrominance channel data and selecting image blocks with a local standard deviation less than a threshold, generating estimated luminance noise filtering parameters based on said chrominance channel filtering;

applying said luminance noise filtering parameters to filter luminance noise of said luminance channel data; and combining said filtered chrominance channel data and said filtered luminance channel data for producing a first filtered output, said first filtered output being a spatially filtered full color video frame; and blending said first filtered output with a second filtered output of a previous noise-reduced video frame to create a new noise-reduced video where a relative weight of the first filtered output and the second filtered output used in the blending of the first and second filtered outputs depends on the amount of foreground activity within the frames where relatively more weight is given to the previous noise-reduced video frame for background regions and relatively more weight to the first filtered output for foreground regions.

15. The method of claim 14, wherein the weighting for blending between said first filtered output and said second filtered output is a function of said noise and of image differences.

16. The method of claim 15, wherein said image difference comprises pixel value differences between said first filtered output and said second filtered output.

* * * * *